US007451329B2

(12) United States Patent
Schindler

(10) Patent No.: US 7,451,329 B2
(45) Date of Patent: Nov. 11, 2008

(54) TECHNIQUES FOR MEASURING NETWORK RESISTIVE LOSS WITHIN A POWER-SOURCING APPARATUS

(75) Inventor: Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 11/221,966

(22) Filed: Sep. 8, 2005

(65) Prior Publication Data

US 2007/0064922 A1 Mar. 22, 2007

(51) Int. Cl.
*G06F 1/00* (2006.01)
*G06F 11/30* (2006.01)

(52) U.S. Cl. .................. 713/300; 713/310; 713/320; 713/321; 713/322; 713/323; 713/324; 713/330; 713/340; 455/343.5; 307/38

(58) Field of Classification Search ............ 713/300, 713/310, 320–324, 330, 340; 455/343.5; 307/38
See application file for complete search history.

(56) References Cited

U.S. PATENT DOCUMENTS

| 5,550,917 | A | 8/1996 | Tallec ................... 379/442 |
| 5,625,621 | A | 4/1997 | Christensen et al. ....... 370/248 |
| 5,642,052 | A | 6/1997 | Earle .................... 324/556 |
| 5,670,937 | A | 9/1997 | Right et al. ............. 340/506 |
| 5,680,397 | A | 10/1997 | Christensen et al. ....... 370/421 |
| 5,784,237 | A | 7/1998 | Velez .................... 361/62 |
| 5,912,963 | A | 6/1999 | Begeja et al. ............ 379/221 |
| 5,936,442 | A | 8/1999 | Liu et al. ............... 327/142 |
| 6,040,969 | A | 3/2000 | Winch et al. ............. 361/82 |
| 6,098,174 | A | 8/2000 | Baron et al. ............. 713/300 |
| 6,233,235 | B1 | 5/2001 | Burke et al. |

(Continued)

FOREIGN PATENT DOCUMENTS

EP     0 777 357 A2    4/1997

(Continued)

OTHER PUBLICATIONS

Galit Mendelson, "Installing an IP Telephony Network Using Power over LAN", Online, (Nov. 3, 2002) pp. 1-10, XP002340946 Inet, Retrieved from the Internet: URL: http://www.powerdsine.com/Documentation/WhitePapers/Installing_IP_Telephony_network_with_PoL.pdf>retrieved on Aug. 16, 2005, p. 7, line 16-line 19.

*Primary Examiner*—Abdelmoniem Elamin
(74) *Attorney, Agent, or Firm*—BainwoodHuang

(57) ABSTRACT

Improved techniques involve provisioning power for a remote device through a data communications cable. Such techniques involve providing a first electrical stimulus (e.g., a first voltage, $V_1$) to the data communications cable and the remote device, and sensing a first electrical response (e.g., a first current, $I_1$) to the first electrical stimulus from the data communications cable and the remote device. Additionally, the techniques involve providing a second electrical stimulus (e.g., a second voltage, $V_2$) to the data communications cable and the remote device, and sensing a second electrical response (e.g., a second current, $I_2$) to the second electrical stimulus from the data communications cable and the remote device, the second electric stimulus being different than the first electrical stimulus. Furthermore, the techniques involve identifying a power demand for the data communications cable and the remote device. The power demand is based on the first and second electrical responses.

19 Claims, 4 Drawing Sheets

U.S. PATENT DOCUMENTS

| | | | |
|---|---|---|---|
| 6,317,839 B1 | 11/2001 | Wells ........................... | 713/320 |
| 6,345,047 B1 | 2/2002 | Regnier ...................... | 370/352 |
| 6,356,514 B1 | 3/2002 | Wells ........................... | 713/300 |
| 6,357,011 B2 | 3/2002 | Gilbert | |
| 6,473,608 B1 | 10/2002 | Lehr et al. ................... | 455/402 |
| 6,483,318 B1 * | 11/2002 | White et al. ................. | 324/539 |
| 6,546,494 B1 | 4/2003 | Jackson et al. .............. | 713/300 |
| 6,629,248 B1 | 9/2003 | Stachura ...................... | 719/340 |
| 6,674,271 B2 | 1/2004 | Choo et al. ................... | 323/282 |
| 6,701,443 B1 | 3/2004 | Bell .............................. | 713/300 |
| 6,874,093 B2 | 3/2005 | Bell .............................. | 713/300 |
| 6,952,785 B1 | 10/2005 | Diab et al. .................... | 713/300 |
| 2003/0135766 A1 | 7/2003 | Syskowski et al. ........... | 713/300 |
| 2004/0025066 A1 | 2/2004 | Jackson et al. ............... | 713/300 |
| 2004/0148532 A1 | 7/2004 | Bell ............................... | 713/300 |
| 2005/0262364 A1 * | 11/2005 | Diab et al. .................... | 713/300 |
| 2005/0283627 A1 | 12/2005 | Diab et al. .................... | 713/300 |
| 2006/0053324 A1 * | 3/2006 | Giat et al. ..................... | 713/300 |
| 2006/0063509 A1 * | 3/2006 | Pincu et al. ................... | 455/402 |
| 2006/0100799 A1 * | 5/2006 | Karam ........................... | 702/57 |
| 2006/0143583 A1 | 6/2006 | Diab et al. ..................... | 716/4 |
| 2006/0164108 A1 * | 7/2006 | Herbold ........................ | 324/691 |

FOREIGN PATENT DOCUMENTS

| | | |
|---|---|---|
| GB | 2 034 055 A | 5/1980 |
| JP | 200214964 A | 8/2000 |

* cited by examiner

TECHNIQUES FOR MEASURING NETWORK RESISTIVE LOSS WITHIN A POWER-SOURCING APPARATUS

BACKGROUND

A typical phantom power communications system includes power-sourcing communications equipment and a set of remotely-powered network devices that connect to the power-sourcing communications equipment though a set of network cables. The power-sourcing communications equipment includes a power supply and transmit/receive circuitry. During operation, the power supply provides power to the remotely-powered network devices through the network cables, and the transmit/receive circuitry concurrently exchanges data with the remotely-powered network devices through the same network cables. Accordingly, the users of the remotely-powered network devices are not burdened with having to separately connect their devices to power sources (e.g., wall outlets).

There are a variety of conventional approaches that an equipment manufacturer uses when establishing design specifications for the power-sourcing communications equipment. One conventional approach, which is hereinafter referred to as the conventional "over-provisioning approach", involves the equipment manufacture designing the power-sourcing communications equipment for a worst-case scenario in which the power-sourcing communications equipment connects to a maximum number of remotely-powered network devices through network cables at their maximum specified lengths (e.g., 100 meters in accordance with the IEEE 802.3af standard). Under this approach, the equipment manufacturer provisions particular characteristics of the power-sourcing communications equipment for a maximum power draw (e.g., maximum power supplied to each remote device and maximum power loss over each network cable due to the network cables being at their maximum lengths). To this end, the manufacturer makes certain aspects of the equipment large enough to adequately fulfill the maximum power draw, e.g., the manufacturer makes sure the power supply is large enough, makes sure that there are enough circuit board power planes or that the circuit board power planes and power converters are robust enough to carry worst case current, makes sure that the fan assembly is strong enough to provide adequate cooling, etc.). In some situations, the worst case scenario for certain high-end systems may require the manufacturer to provision the power-sourcing communications equipment for larger amperage circuitry (e.g., to upgrade power cabling from 15 Amp cords and plugs to 20 Amp cords and plugs, etc.).

Another conventional approach, which is hereinafter referred to as the conventional "statistical methods" approach, involves the equipment manufacture designing the power-sourcing communications equipment based on probable uses of the equipment in the field. For example, the manufacturer may offer two models of power-sourcing communications equipment, namely, a lower-end model which is designed for lower power demand situations, and a higher-end model which is designed for higher power demand situation, and then rely on the customer to select the best-suited model for a particular installation location.

There are also industry standards which attempt to provide guidelines for manufacturing certain types of power-sourcing communications equipment. For example, the IEEE 802.3af standard, which is also called the "Power over Ethernet" standard, defines ways to build Ethernet power-sourcing equipment and powered terminals. In particular, the IEEE 802.3af standard identifies ways to deliver certain electrical features (e.g., 48 volts) of AC power over unshielded twisted-pair wiring (e.g., Category 3, 5, 5e or 6 network cables, patch cables, patch-panels, outlets and connecting hardware) to a variety of Ethernet devices or terminals such as IP phones, wireless LAN access points, laptop computers and Web cameras.

In the context of the IEEE 802.3 Ethernet Standard where the power-sourcing communications equipment is called the PSE (Power Sourcing Equipment) and the remote device is called the PD (Powered Device), some PSEs include Time Domain Reflectometry circuitry which determines the integrity of the cables, i.e., the data channels. The PSEs then communicate with PDs through the cables with improved cable utilization based on the qualities of the cables (e.g., older cables, Category 5e cables, etc.).

SUMMARY

Unfortunately, there are deficiencies to the above-described conventional approaches to designing power-sourcing communications equipment for delivering phantom power to remotely-powered devices. For example, in the above-described conventional over-provisioning approach, the equipment manufacturer essentially over-designs or over-engineers the power-sourcing communications equipment beyond what is necessary in order to satisfy an extremely rare (i.e., low probability) worst-case situation. Such over-provisioning increases the cost of the equipment, places an unnecessarily low limit to the number of ports that can be remotely powered, and wastes resources (e.g., oversized power supplies, circuit boards, converters, cables, fans assemblies, etc.).

Additionally, in the above-described conventional statistical methods approach, the equipment manufacturer depends on assumptions regarding expected power consumption and essentially takes a gamble that the equipment will work properly in each installation location, on a location by location basis. Such an approach is unreliable and often does not comply with industry standards. For example, the IEEE 802.3af standard prohibits the use of the statistical methods approach.

In contrast to the above-described conventional over-provisioning and statistical methods approaches to designing power-sourcing communications equipment, embodiments of the invention are directed to techniques for determining power demands for powering remote devices through network cables using measured network resistive loss which is determined by a power-sourcing apparatus. Such techniques enable accurate identification of the power demands and thus alleviate the need to over-provision equipment, or rely on statistical methods. Moreover, such techniques are capable of involving measurements performed exclusively at the power-sourcing end of the cable. Accordingly, there is no need for specialization at the remotely powered devices, and the power-sourcing apparatus is completely compatible with legacy remotely powered devices.

One embodiment is directed to a method for provisioning power for a remote device through a data communications cable (e.g., Category 3, 5, 5e, or 6 network cables, the associated connectors, etc.). The method involves providing a first electrical stimulus (e.g., a first voltage, $V_1$) to the data communications cable and the remote device, and sensing a first electrical response (e.g., a first current, $I_1$) to the first electrical stimulus from the data communications cable and the remote device. Additionally, the method involves providing a second electrical stimulus (e.g., a second voltage, $V_2$) to the data communications cable and the remote device, and sensing a second electrical response (e.g., a second current, $I_2$) to the second electrical stimulus from the data communications cable and the remote device, the second electric stimulus being different than the first electrical stimulus. Furthermore the method involves identifying a power demand for the data communications cable and the remote device. The power demand is based on (among other things) the first and second electrical responses.

For example, identification of the total power demand may involve computing power dissipation through the data communications cable by (i) ascertaining a resistance, $R_{CABLE}$, of the cable where $$R_{CABLE} = \frac{V_1 \times I_1 - V_2 \times I_2}{(I_1)^2 - (I_2)^2}, \text{ and}$$

(ii) assessing power loss through the data communications cable based on the cable resistance, $R_{CABLE}$. In particular, the power demand for the data communications cable equals the square of the current (I) through the data communications cable multiplied by the resistive loss through the cable, i.e., $R_{CABLE}$. This power demand for the data communications cable plus the power demand of the remote device at the other end of the cable equals an accurate total power demand for remotely powering the remote device, i.e., a precisely determined power demand, rather than a worst case estimate or a statistically-based approximation.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for determining power demands using measured network resistive loss performed by a power-sourcing apparatus. Such techniques enable accurate identification of power demands for powering remote devices through data communications cables, and thus alleviate the need to over-provision equipment, or rely on statistical methods, as in conventional approaches. Moreover, such techniques are capable of involving measurements performed exclusively at the power-sourcing end of the data communications cable. Accordingly, there is no need for specialized remotely powered devices, and the power-sourcing apparatus is completely compatible with legacy remotely powered devices. In particular, these techniques enable smart in-line power provisioning for phantom power applications as well as enable safeguarding against inadvertently attempting to provide more power than what is available in the power budget and thus avoiding damaging the power-sourcing apparatus.

Figure 1:
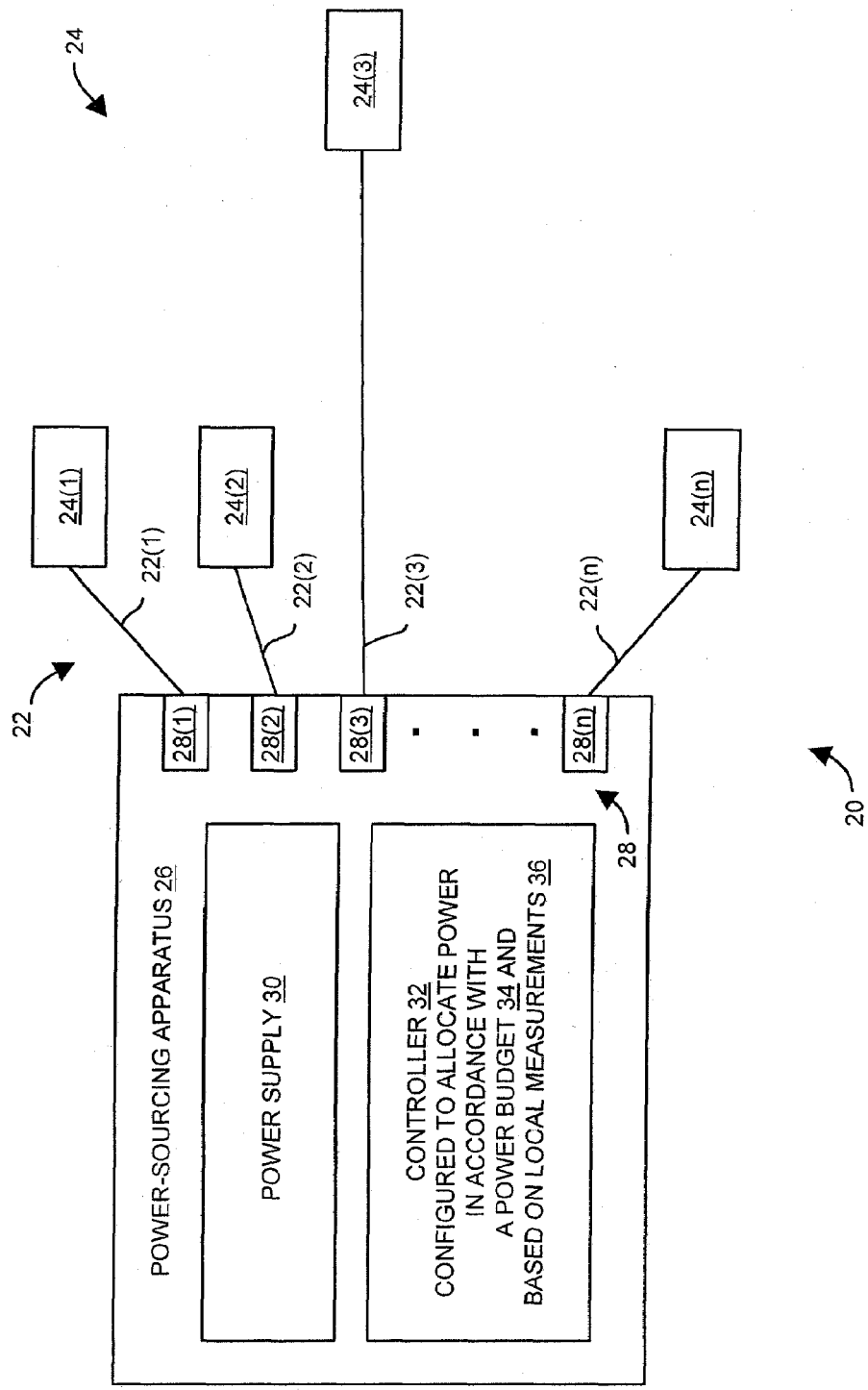
FIG. 1 is a block diagram of a communication system having a power-sourcing apparatus configured to provision power to a set of remote devices based on accurate power demands determined by network resistive losses.

FIG. 1 shows a communications system 20 (e.g., a VoIP phone system) which is suitable for use by various embodiments of the invention. The communications system 20 includes a set of data communications cables 22(1), . . . , 22(n) (collectively, data communications cables 22), a set of remote devices 24(1), . . . , 24(n) (collectively, remote devices 24), and a power-sourcing apparatus 26. The power-sourcing apparatus 26 includes a set of ports 28(1), . . . , 28(n) (collectively, ports 28), a power supply 30, and a controller 32. It should be understood that each cables 22 generally refers to all of the component (e.g., network cables, connectors, patch panels, and so on) along the path from each port 28 to each corresponding remote device 24 (e.g., a VoIP phone).

The controller 32 is configured to allocate power from the ports 28 in accordance with a power budget 34 based on local electrical measurements 36 which enable identification of network resistive loss, $R_{CABLE}$, for each cable 22. Such power allocation delivers phantom power to the remote devices 24 thus alleviating the need for the remote devices 24 to make separate connections to other power sources. Additionally, such identification of network resistive loss for each cable 22 enables the power-sourcing apparatus 26 to precisely determine the power demand for each port 28. That is, the power demand for each port 28 equals the power loss through the data communications cable 22 (i.e., the power dissipated through the cable 22) and the power demand of the remote device 24 connected to that port 28. This amount of power which is required to satisfy the power loss through the cable 22 and the power demand of the remote device 24 at the end of the cable 22 is generally referred to as the power demand for the cable 22 and the device 24. Further details will now be provided with reference to FIG. 2.

Figure 2:
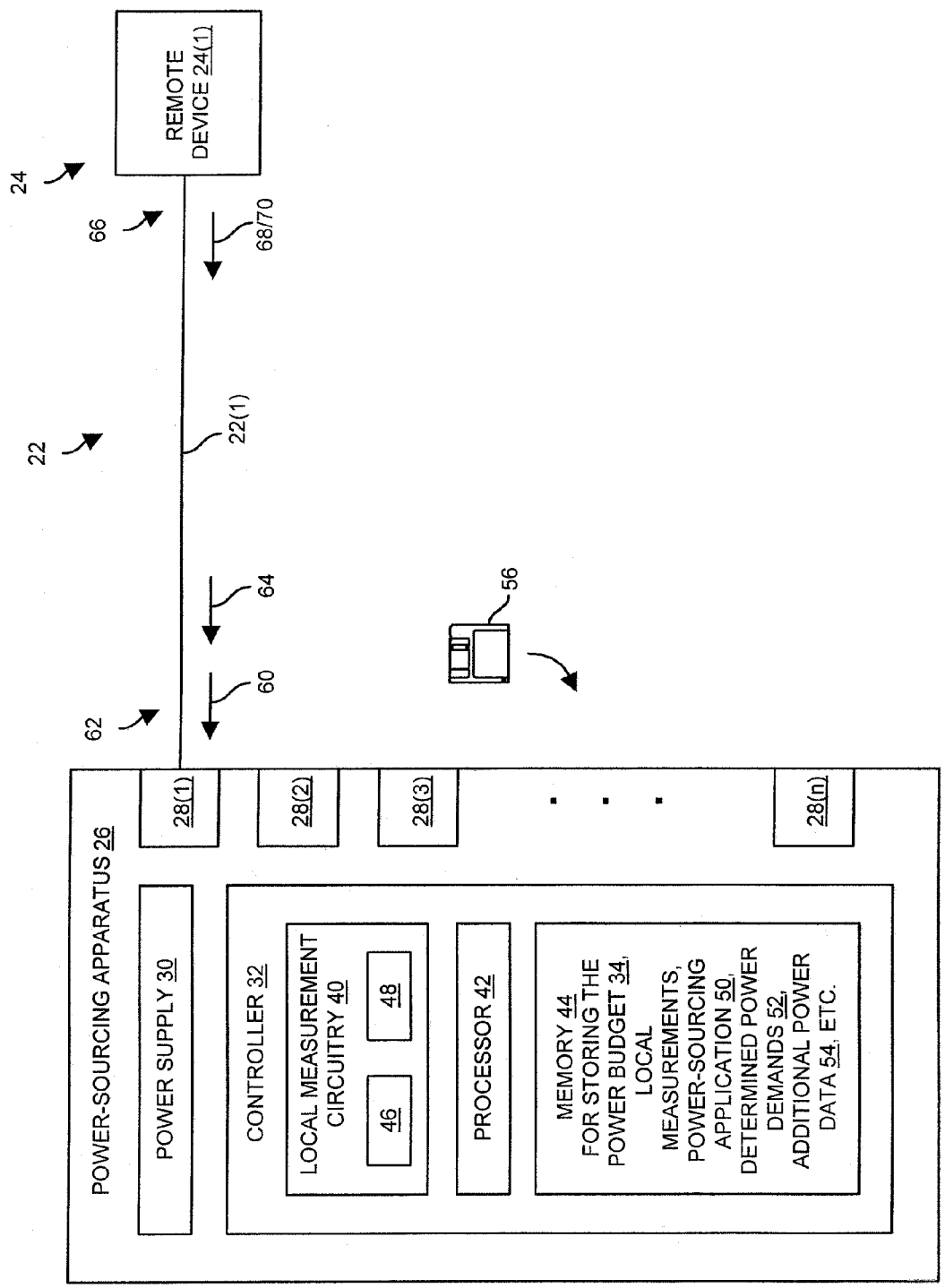
FIG. 2 is a block diagram of particular details of the communication system of FIG. 1 in accordance with a first embodiment.

FIG. 2 shows a block diagram of the power-sourcing apparatus 26 connected to the cable 22(1) and the remote device 24(1) in accordance with a general embodiment of the invention. The other cables 22 and other remote devices 24 are omitted from FIG. 2 for simplicity.

As shown in FIG. 2, the controller 32 includes local measurement circuitry 40, a processor 42 and memory 44. The local measurement circuitry 40 includes a voltage sensor 46 and a current sensor 48. The voltage sensor 46 is configured to sense a voltage, V, applied by the power supply 30 to each cable 22. The current sensor 48 is configured to sense a current, I, through each cable 22.

The memory 44 (e.g., flash ROM, DRAM, combinations thereof, etc.) is configured to store, among other things, the power budget 34, the local measurements 36 (e.g., voltage and current measurements provided by the sensors 46, 48), a power-sourcing application 50, power demands 52 and additional power data 54. Initially, the power budget 34 and the power-sourcing application 50 are capable of being delivered to the memory 44 via one or more computer program products 56. Although only one computer program product 56 is shown and is illustrated as a diskette by way of example only, a variety of communications and storage media are suitable for use (e.g., a set of CD-ROMs, tapes, memory cards or sticks, network downloads, propagated signals, combinations thereof, etc.).

During operation, the controller 32 of the power-sourcing apparatus 26 (i.e., the processor 42 executing the power-sourcing application 50) determines the total power demand of the cable 22(1) and the remote device 24(1), and provides power to the remote device 24(1) through the cable 22(1) if the power budget 34 is capable of supporting the determined power demand, i.e., if the remaining power budget 34 is greater than the determined power demand. If the remaining power budget 34 is less than the determined power demand, the controller 32 does not provide power to the remote device 24(1) thus avoiding a potential brown-out situation and possibly damaging the power-sourcing apparatus 26.

When the controller 32 determines the power demand of the cable 22(1) and the remote device 24(1), the controller 32 individually identifies the power projected to be dissipated by the cable 22(1) and the power projected to be consumed by the remote device 24(1). The way in which the controller 32 identifies how much power the remote device 24(1) will consume can be accomplished using a variety of standard approaches. For example, using an IEEE method of discovery, the controller 32 is capable of obtaining a type identifier from the remote device 24(1) (by communicating with the device 24(1) through the cable 22(1)), and looking up the maximum power draw $P_{max}$ of the remote device 24(1) by searching a table or database of such information (e.g., see the additional power data 54 stored in the memory 44 in FIG. 2).

However, the controller 32 determines the power to be dissipated by the cable 22(1) by identifying the resistive loss through the cable 22(1). As mentioned earlier, it should be understood that the term "cable" actually refers to the entire electrical pathway from a port 28 of the apparatus 26 to the associated remote device 24, i.e., inclusive of connectors, patch cords, patch panels, etc. all of which dissipate power due to resistance inherent in each component along the electrical pathway. Such resistance is referred to within this description as network resistive loss, $R_{CABLE}$.

Along these lines, the controller 32, under direction of the power-sourcing application 50, directs the local measurement circuitry 40 to precisely measure voltage 60 applied to one end 62 of the cable 22(1) and current 64 passing through the cable 22(1). In some arrangements, the local measurement circuitry 40 initially operates while the port 28(1) is in a preliminary or start-up low power state when the remote device 24(1) is first connected to a distant end 66 of the cable 22(2). At this time, the remote device 24(1) draws minimal power and sends a message 68 to the controller 32 having an identifier 70 which identifies the type of remote device 24(1) (e.g., VoIP phone, laptop, etc.). Such arrangements are well suited for handling power-up, detection and classification situations (e.g., IEEE 802.3af detection and/or classification phases).

During this time, the controller 32 in combination with the power supply 30 takes local voltage and current measurements 36, and uses these measurements 36 to calculate the resistance, $R_{CABLE}$. In particular, the controller 32 directs the power supply 30 to (i) provide different voltages $V_1$ and $V_2$ onto the end 62 of the cable 22(1) and (ii) measure the respective currents $I_1$ and $I_2$ passing through the cable 22(1) in response to the voltages $V_1$ and $V_2$. The voltage sensor 46 provides the controller 32 with an accurate voltage measurement of each voltage $V_1$ and $V_2$, and the current sensor 48 provides the controller 32 with an accurate current measurement of each current $I_1$ and $I_2$.

Once the controller 32 has these measurements 36, the controller 32 then determines the resistance, $R_{CABLE}$, of the data communications cable 22(1) using the following equation $$R_{CABLE} = \frac{V_1 \times I_1 - V_2 \times I_2}{(I_1)^2 - (I_2)^2}. \tag{1}$$

The power loss through the data communications cable 22(1) is then computed by multiplying the resistance, $R_{CABLE}$, by the current 64 through the cable 22(1).

It should be understood that stable values for measurements are capable of being obtained by recording multiple results and (i) waiting for values to reach a constant and repeated value or, (ii) correlating a measurement with time and locating a point in time where values remain constant. This same process is preferably done for both measurements and if method (ii) is used, the time point for both current values, $I_1$ and I2, should be correlated.

It should be further understood that Equation (1) is easily derived if one assumes that the power demand of the remote device, $P_{PD}$, remains substantially constant regardless of the voltage applied to the power-sourcing end 62 of the cable 22(1), i.e., regardless of an acceptable difference in the output voltage $V_{PSE}$ at the port 28(1) such as a few tenths of a Volt. A tradeoff between port voltages used and other system properties such as ADC resolution, settling time for the measurements, and the amount of error budget considered can be made. The error budget over-reports the power demand reported to the high-level-PoE-application software in order to ensure that adequate power is budgeted for and that power is still saved when compared to traditional approaches of power allocation. Such an assumption is reliable since the vast majority of conventional DC-to-DC converters are designed to deliver constant power despite variations in DC input voltage. Accordingly, the power demand of the cable 22(1) and the remote device 24(1) can be represented as follows:

$$P_{PSE} = P_{CABLE} + P_{PD} \tag{2},$$

where $P_{PSE}$ is the total power demand of the cable 22(1) and the remote device 24(1), $P_{CABLE}$ is the power dissipated by the cable 22(1), and $P_{PD}$ is the power consumed by the remote device 24(1).

Thus, when the power-sourcing apparatus 26 provides different voltages $V_1$ and $V_2$ at the port 28(1), the respective power demands $P_{PSE1}$ and $P_{PSE2}$ can be represented as follows:

$$P_{PSE1} = P_{CABLE2} + P_{PD1} \tag{3},$$

and $$P_{PSE2} = P_{CABLE2} + P_{PD2} \tag{4}.$$

It should be understood that Equations (3) and (4) can be re-written in terms of measured voltage and current as follows:

$$V_{PSE1} \times I_1 = R_{CABLE} \times (I_1)^2 + P_{PD1} \tag{5},$$

and $$V_{PSE2} \times I_2 = R_{CABLE} \times (I_2)^2 + P_{PD2} \tag{6}.$$

As mentioned above, it is safe to rely on the assumption that the power demand of the remote device 24(1) remains substantially constant even though the voltage provided at the end 62 of the cable 22(1) varies slightly. Thus, subtracting Equation (6) from Equation (5), provides the following:

$$V_{PSE1} \times I_1 - V_{PSE2} \times I_2 = R_{CABLE} \times ((I_1)^2 - (I_2)^2) \quad (7).$$

Finally, solving for $R_{CABLE}$ results in Equation (1) which was shown earlier. Accordingly, the resistive loss of the cable 22(1) can be easily determined based on measurements of voltage 60 and respective currents 64 at the end 62 of the cable 22(1).

Once the controller 32 of the power-sourcing apparatus 26 has determined $R_{CABLE}$, the controller 32 determines the overall power demand through the port 28(1). That is, the controller 32 can determine the current demand of the remote device 24(1) based on the maximum power draw $P_{max}$ of the remote device 24(1). The controller 32 can use this current demand and the resistive loss $R_{CABLE}$ to compute the maximum power dissipated through the cable $P_{cable}$.

At this point, the controller 32 adds the required power dissipation $P_{cable}$ through the cable 22(1) and the power demand (i.e., the power consumption rating) of the remote device 24(1) $P_{max}$ that connects to the apparatus 26 through that cable 22(1) to derive the total power demand. Then, as mentioned above, the controller 32 is capable of determining whether the power budget 34 supports the total power demand through the port 28(1). In particular, if the power budget 34 supports this power demand, the controller 32 allocates power from the power budget 34 to the remote device 24(1) through the port 28(1) and downwardly adjusts the power budget 34 to account for the this power allocation. The remote device 24(1) responds by transitioning from the. preliminary state to a normal operating state in which the remote device 24(1) is now capable of operating under higher power. However, if the power budget 34 does not support this power demand, the controller 32 rejects allocation of power from the power budget 34 to the remote device 24(1) through the port 28(1).

It should be understood that the controller 32 is capable of re-performing the above-described procedure while the remote device 24(1) operates in a state other than a start up state. For example, the controller 32 is capable of re-performing the above-described procedure while the remote device 24(1) is under high power, i.e., when the remote device 24(1) is in a normal operating state. The result of the procedure while the remote device 24(1) operates under high power is the exact or actual power draw. Accordingly, the controller 32 is capable of obtaining both the worst case power draw and the actual power draw for the remote device 24(1) by performing the above-described procedure at different times of operation.

In some arrangements, the power-sourcing apparatus 26 is capable of performing the above-described procedure in a variety of different stages of remote device operation. In certain arrangements, the power-sourcing apparatus 26 is configured to perform the above-described procedure during each of a power-on phase, a detection phase, and a clarification phase of operation, as defined by the IEEE 802.3af standard. In these arrangements, during the power-on phase, the remote device 24(1) (i.e., a PD) is configured to be viewed by the power-sourcing apparatus 26 as a constant power load. During the detection phase, the remote device 24(1) is configured to be viewed approximately as a 25 kOhm resistor. During the classification phase, the remote device 24(1) is configured to be viewed as a current source. In each of these phases, the controller 32 of the power-sourcing apparatus 26 is configured to adapt its computational operations to properly determine the resistive loss (e.g., see Equations (1) through (7) above). Such configurations are intended to belong to various embodiments of the invention.

It should be further understood that the controller 32 performs a similar set of operations when provisioning power to the other remote devices 24 through the other cables 22. In all cases, the power-sourcing apparatus 26 enjoys a very accurate view of power dissipation through the cables 22, thus enabling the apparatus 26 to manage power more effectively. Further details will now be provided with reference to FIG. 3.

Figure 3:
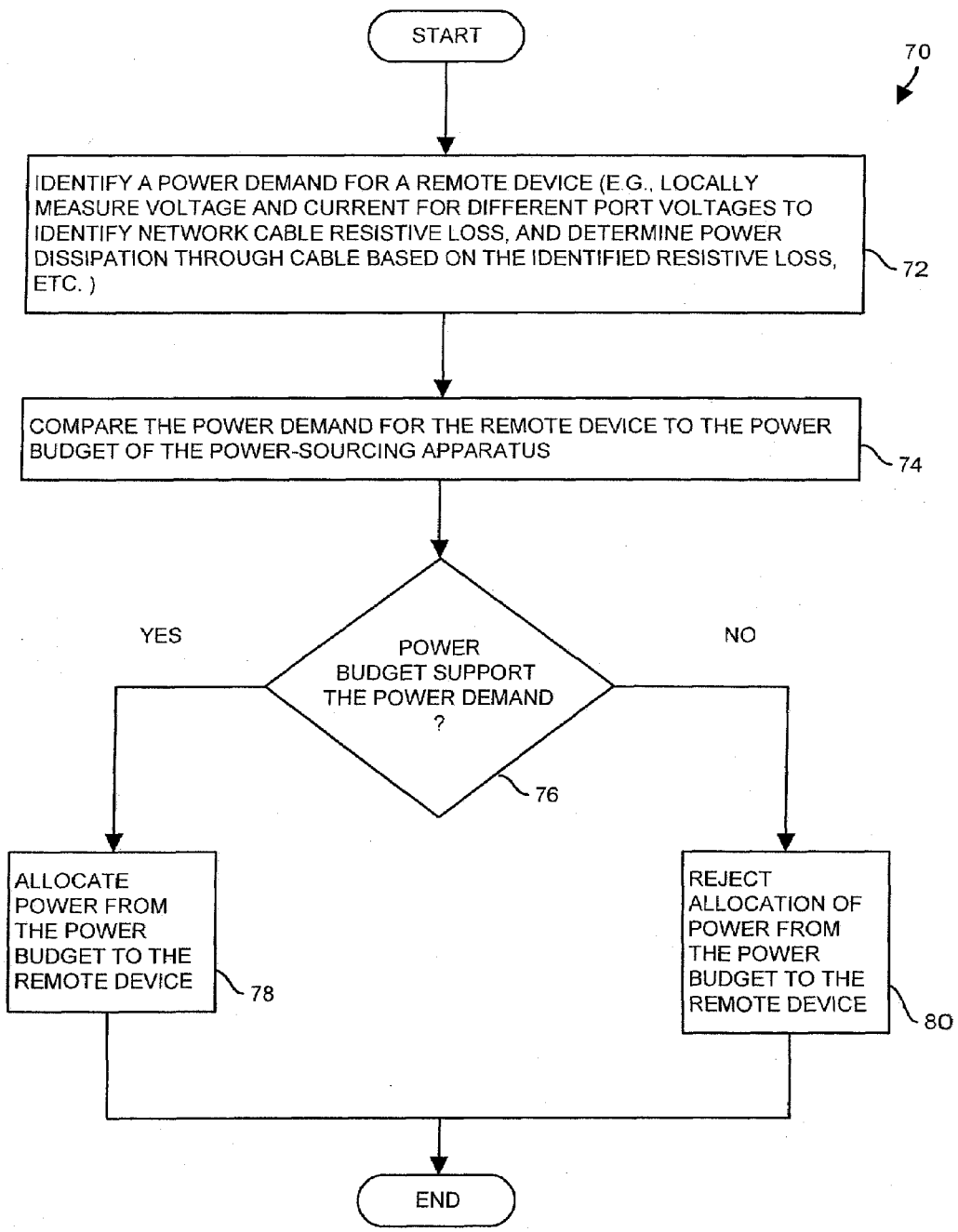
FIG. 3 is a flowchart of a procedure which is performed by a power-sourcing apparatus of the communications system of FIG. 1.

FIG. 3 shows a procedure 70 which is performed by the controller 32 of the power-sourcing apparatus 26 in response to detection of a remote device 24 connected to a port 28 through a cable 22. The controller 32 performs the procedure 70 each time the controller 32 detects a new remote device 24 connected to a port 28. For example, at startup of the power-sourcing apparatus 26, the controller 32 performs the procedure 70 for each port 28 starting with port 28(1), 28(2), and so on. As another example, the controller 32 performs the procedure 70 dynamically in an incremental manner after startup, each time the apparatus 26 detects a new remote device 24 connecting to a port 28.

In step 72, the controller 32, under direction of the power-sourcing application 50, identifies a power demand for a remote device 28. In particular, the controller 32 directs the local measurement circuitry 36 to measure the resistive loss, $R_{CABLE}$, and then calculates a cable dissipation power value $P_{cable}$ based on the resistive loss, $R_{CABLE}$. Next, the controller 32 sums, as the total power demand or rating 52 for the cable 22 and the remote device 24, the calculated cable dissipation power value and the identified power demand for the remote device 24.

In step 74, the controller 32 generates a comparison between the total power demand 52 and the power budget 34 of the apparatus 26 and proceeds to step 76. If the power budget 34 supports this demand 52 (e.g., if the power budget 34 is greater than the power demand 52), step 76 proceeds to step 78. Otherwise, if the power budget 34 does not support this demand 52 (e.g., if the power budget 34 is not greater than the power demand 52), step 76 proceeds to step 80.

In step 78, the controller 32 allocates power from the power budget 34 to the remote device 24. In response to such phantom power delivery, the remote device 24 becomes operational.

On the other hand, in step 80, the controller 32 rejects allocation of power from the power budget 34. In this situation, the remote device 24 does not become operational under phantom power and drawbacks associated with attempting to provide power beyond the means of the apparatus 26 (e.g., damage, a brown-out condition, etc.) are avoided.

It should be understood that such smart power budgeting alleviates the need for manufacturers to over-provision their power-sourcing equipment thus saving costs of not having to provide larger than necessary equipment, i.e., larger power supplies, circuit boards, power cables, fan assemblies, etc. Rather, the manufacturers are now capable of properly provisioning their power-sourcing equipment without fear of damaging the equipment due to improperly configuring the equipment and with a relatively low cost per Watt metric. To this end, the power-sourcing apparatus 26 allocates power through a port 28 only if the power budget 34 supports such allocation. There is no worry of causing damage (e.g., there is no risk of burning out the power supply 30) or encountering brown-out conditions due to inadequate power provisioning.

It should be understood that the procedure 70 is capable of being performed exclusively at the power-sourcing end 62 of the cable 22 (e.g., also see the diagram in FIG. 2). As a result, there is no need for any specialized measurement circuitry at the remote device 24 at the other end 66 of the cable 22. Accordingly, the power-sourcing apparatus 26 is completely compatible with legacy remotely powered devices (i.e., any conventional PD). Nevertheless, the power-sourcing apparatus 26 works with specialized remotely powered devices as well. An example of a specialized remotely powered device and a system which is configured to provision power to such a remote device from a power budget is described in U.S. patent application Ser. No. 10/850,205, entitled "METHODS AND APPARATUS FOR PROVISIONING PHANTOM POWER TO REMOTE DEVICES", filed on May 20, 2004 by the same Assignee as this current case, the teachings of which are hereby incorporated by reference in their entirety. Further details of the invention will now be provided with reference to FIG. 4.

Figure 4:
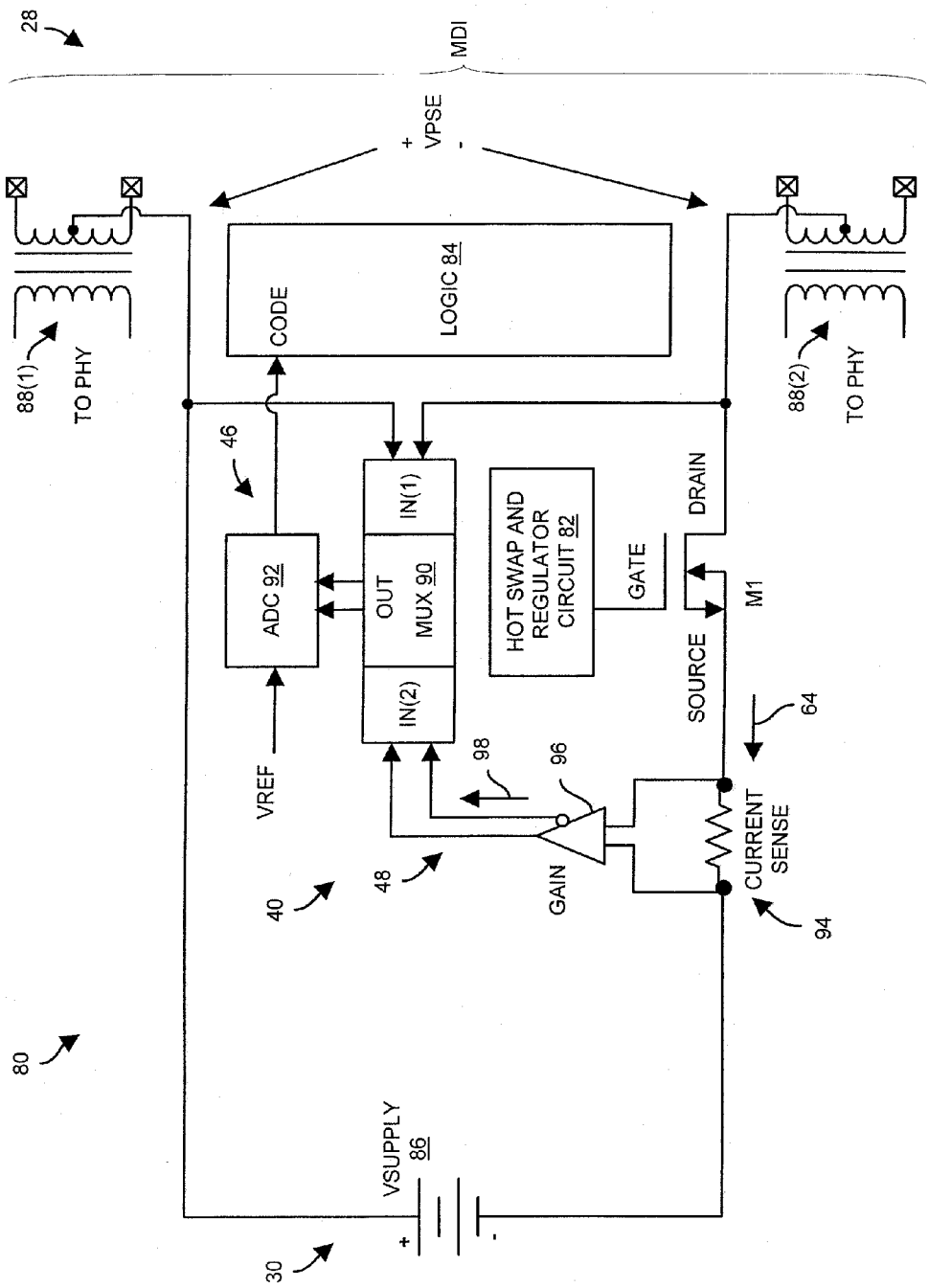
FIG. 4 is a detailed diagram a portion of the power-sourcing apparatus of FIG. 1 which is involved with the operation of each port of the power-sourcing apparatus.

FIG. 4 is a detailed diagram of a portion 80 of the power-sourcing apparatus 26 of FIG. 1 which is involved with voltage and current sensing from the perspective of a port 28 (or MDI) of the power-sourcing apparatus 26 (e.g., also see the port 28(1) which connects to the cable 22(1) leading to the remote device 24(1) in FIG. 2). The portion 80 includes the power supply 30, the local measurement circuitry 40, a hot swap and regulator circuit 82 and logic 84. It should be understood that it is possible for each port 28 to share the same voltage and current sensing circuitry or alternatively have its own dedicated circuitry.

As shown in FIG. 4, the power supply 30 includes DC voltage source 86 having a positive terminal (+) which connects to the centertap of a first transformer 88(1), and a negative terminal (−) which connects to the centertap of a second transformer 88(2) for DC power delivery from the port 28. The transformers 88(1), 88(2) further connect to the PHY for data communications (e.g., transmission of a differential signal pair occurs through one transformer, and receipt of a differential signal pair occurs through the other transformer).

As further shown in FIG. 4, the voltage sensor 46 of the local measurement circuitry 40 is formed by a multiplexer (MUX) 90 and an analog-to-digital converter (ADC) 92. The current sensor 48 of the local measurement circuitry 40 is formed by a resistor 94, an amplifier 96, the multiplexer 90 and the analog-to-digital converter 92. The hot swap and regulator circuit 82 includes a transistor MI (e.g., a MOSFET) which is configured to provide control over the output voltage $V_{PSE}$ at the port 28. The logic 84 (e.g., the processor 42 running the power-sourcing application 50, also see FIG. 2) is configured to perform voltage and current data collection, as well as calculate the resistive loss through a cable attached to the port 28. In contrast to conventional approaches to obtaining port voltages, the voltage sensor 46 provides a measurement of the actual port voltage thus improving the accuracy of the power demand calculation by using the actual PSE port voltage, the measured cable resistance and the PD power demand.

During operation of the power-sourcing apparatus 26, the hot swap and regulator circuit 82 is configured to slowly increase the output voltage $V_{PSE}$ to avoid damaging any remote device 24 connected to the port 28 as well as the power-sourcing apparatus 26 itself. Such an increase occurs in response to a gradually rising gate voltage at the transistor M1. Without such a slow increase of the output voltage $V_{PSE}$ (i.e., if the output voltage $V_{PSE}$ were to be switched on instantaneously), the remote device 24 and/or the apparatus 26 could possibly sustain damage.

Because of the above-described operation of the hot swap and regulator circuit 82 during initial powering up of a remote device 24 through the port 28, the hot swap and regulator circuit 82 is a well-suited candidate for providing slightly different output voltages $V_{PSE}$ as part of the process of determining the network resistive loss $R_{CABLE}$. That is, the power-sourcing apparatus 26 changes the gate voltage at the transistor M1 to provide the different voltages $V_1$ and $V_2$ which were described earlier. This feature will now be described in further detail.

In one embodiment, as the hot swap and regulator circuit 82 increases the output voltage $V_{PSE}$ as part of the process of powering up a remote device 24, the hot swap and regulator circuit 82 temporarily holds the output voltage $V_{PSE}$ constant at a time T1 to enable the local measurement circuitry 40 to obtain a voltage and current measurement. In particular, to measure the output voltage $V_{PSE}$ at the port 28 (e.g., see $V_1$ mentioned earlier), the multiplexer 90 passes the signal from a first input IN(1) to its output OUT for receipt by the analog-to-digital converter 92. Using a voltage reference $V_{REF}$, the analog-to-digital converter 92 provides a digital representation of the output voltage $V_{PSE}$ to the logic 84. To measure the current 64 through the port 28 (e.g., see $I_1$ mentioned earlier) while the hot swap and regulator circuit 82 continues to hold the output voltage $V_{PSE}$ constant, the amplifier 96 generates an amplified signal 98 from a voltage sensed across the resistor 94, and the multiplexer 90 passes the amplified signal 98 from a second input IN(2) to its output OUT for receipt by the analog-to-digital converter 92. Using the voltage reference $V_{REF}$, the analog-to-digital converter 92 provides a digital representation of the current 64 to the logic 84. Accordingly, the logic 84 now has measurements $V_1$ and $I_1$.

Next, at a time T2, the hot swap and regulator circuit 82 further increases the output voltage $V_{PSE}$ to a new value and then temporarily holds the output voltage $V_{PSE}$ constant to enable the local measurement circuitry 40 to obtain another voltage and current measurement. Again, the multiplexer 90 switches between its inputs IN(1) and IN(2), and the logic 84 captures new digital representations of the output voltage $V_{PSE}$ and the current 64. That is, the logic 84 now has measurements $V_2$ and $I_2$ in a manner similar to that explained above when obtaining measurements $V_1$ and $I_1$. With measurements $V_1$, $V_2$, $I_1$ and $I_2$ now made, the logic 84 is capable of determining the resistive loss $R_{CABLE}$ using Equation (1) above.

In other embodiments, the voltage and current measurements take place after the remote device 24 is fully powered up. For example, in an ongoing manner, the hot swap and regulator circuit 82 temporarily drops the output voltage $V_{PSE}$ of the port 28 to obtain new voltage and current measurements, and thus provides re-assessment of the resistive loss $R_{CABLE}$ using Equation (1) using the most recent voltage and current measurements. Such re-evaluation of network resistive loss ensures that the power-sourcing apparatus 26 uses recent measurement information rather than rely on potentially stale and inaccurate data.

It should be understood that the use of the same analog-to-digital converter 92 for voltage measurement and current measurement enables cancellation of an error factor k which is inherent in every analog-to-digital converter circuit, i.e., k being the voltage reference accuracy where $$k = \frac{Vref_{actual}}{Vref_{ideal}}.$$

Furthermore, the use of the same amplifier 96 and calibration of the amplifier gain enables reduction of an error factor z which is inherent in every amplifier 96, i.e., z being the error in the amplifier gain where $$z = \frac{Gain_{actual}}{Gain_{ideal}}.$$  (5)

To illustrate these points, Equation (1) has been re-written below to include both the error factor k of the analog-to-digital converter 92 and the error factor z of the amplifier 96.

$$R_{WITHERROR} = \frac{k \times V_1 \times (k \times z) \times I_1 - k \times V_2 \times (k \times z) \times I_2}{(k \times z \times I_1)^2 - (k \times z \times I_2)^2}.$$  (8)

Equation (8) then simplifies to $$R_{WITHERROR} = \frac{k^2 \times z(V_1 \times I_1 - V_2 \times I_2)}{k^2 \times z^2 \times ((I_1)^2 - (I_2)^2)}.$$  (9)

Equation (9) then simplifies to $$R_{WITHERROR} = \frac{1}{z} \times R_{CABLE}.$$  (10)

Accordingly, the error factor k of the analog-to-digital converter 92 is eliminated, and the error factor z of the amplifier 96 can be reduced by calibrating the gain.

As mentioned above, embodiments of the invention are directed to techniques for determining power demands using measured network resistive loss performed by a power-sourcing apparatus 26. Such techniques enable accurate identification of power demands for powering remote devices 24 through data communications cables 22, and thus alleviate the need to over-provision equipment, or rely on statistical methods, as in conventional approaches. Moreover, such techniques are capable of involving measurements performed exclusively at the power-sourcing end of the data communications cable 22. Accordingly, there is no need for specialized remotely powered devices, and the power-sourcing apparatus 26 is completely compatible with legacy remotely powered devices. In particular, these techniques enable smart in-line power provisioning for phantom power applications as well as enable safeguarding against inadvertently attempting to provide more power than what is available in the power budget 34 and thus avoiding damaging the power-sourcing apparatus.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the communications system 20 was described above in the context of VoIP phones by way of example only. The power-sourcing apparatus 26 is capable of being a switch, a router, a hub, a relay, a midspan, a splitter, monitoring equipment or other similar types of equipment.

What is claimed is:

1. In an apparatus connected to a remote device through a data communications cable, a method for provisioning power for the remote device, the method comprising:
   providing a first electrical stimulus to the data communications cable and the remote device, and sensing a first electrical response to the first electrical stimulus from the data communications cable and the remote device;
   providing a second electrical stimulus to the data communications cable and the remote device, and sensing a second electrical response to the second electrical stimulus from the data communications cable and the remote device, the second electric stimulus being different than the first electrical stimulus; and
   identifying a power demand for the data communications cable and the remote device, the power demand being based on the first and second electrical responses;
   wherein the first electrical stimulus is a first voltage, $V_1$; wherein the second electrical stimulus is a second voltage, $V_2$; wherein the first electrical response is a first current, $I_1$; wherein the second electrical response is a second current, $I_2$; and wherein identifying the power demand includes:
   ascertaining a resistance, $R_{CABLE}$, of the data communications cable where $$R_{CABLE} = \frac{V_1 \times I_1 - V_2 \times I_2}{(I_1)^2 - (I_2)^2}, \text{ and}$$

assessing power loss through the data communications cable based on the resistance, $R_{CABLE}$.

2. A method as in claim 1 wherein the apparatus includes a hot swap voltage regulator circuit which is configured to gradually increase output voltage to a nominal operating voltage for the remote device to prevent damaging the remote device when initially powering up the remote device;
   wherein providing the first electrical stimulus and sensing the first electrical response includes directing the hot swap voltage regulator circuit to provide the first voltage, $V_1$, prior to fully powering up the remote device; and
   wherein providing the second electrical stimulus and sensing the second electrical response includes directing the hot swap voltage regulator circuit to provide the second voltage, $V_2$, prior to fully powering up the remote device.

3. A method as in claim 2 wherein sensing the first current, $I_1$, occurs at a temporarily constant first output voltage; wherein sensing the second current, $I_2$, occurs at a temporarily constant second output voltage; and wherein the temporarily constant first and second output voltages are encountered while the hot swap voltage regulator circuit gradually increases the output voltage to the nominal output voltage for the remote device.

4. A method as in claim 2, further comprising:
   sensing current, $I_n$, after the hot swap voltage regulator circuit has gradually increased the output voltage to the nominal output voltage for the remote device; and
   re-identifying the power demand based on the sensed current, $I_n$.

5. A method as in claim 1 wherein the apparatus includes:
   a multiplexer circuit having a first input coupled to a current sensor, a second input coupled to a voltage sensor, and an output, and an analog-to-digital converter circuit having an analog input coupled to the output of the multiplexer circuit and a digital output; and wherein ascertaining a resistance, $R_{CABLE}$, includes:
obtaining a respective digital value representing each of the first voltage, $V_1$, the second voltage, $V_2$, the first current, $I_1$, and the second current, $I_2$, from the digital output of the analog-to-digital converter circuit to cancel out an error factor, k, inherent in the analog-to-digital converter circuit.

6. A method as in claim 5 wherein the apparatus further includes an amplifier interconnected between the first input of the multiplexer and the current sensor; and wherein the method further comprises:
calibrating a gain of the amplifier to reduce an error factor, z, inherent in the amplifier.

7. An electronic system, comprising:
a data communications cable;
a remote device coupled to one end of the data communications cable; and
an apparatus coupled to another end of the data communications cable, the apparatus being configured to provision power for the remote device, the apparatus including:
a set of ports configured to connect to a set of remote devices through a set of data communications cables, one of the set of ports connecting to the data communications cable,
a power supply configured to provide power within a power budget, and
a controller coupled to the set of ports and to the power supply, the controller in combination with the power supply being configured to:
provide a first electrical stimulus to the data communications cable and the remote device, and sense a first electrical response to the first electrical stimulus from the data communications cable and the remote device,
provide a second electrical stimulus to the data communications cable and the remote device, and sense a second electrical response to the second electrical stimulus from the data communications cable and the remote device, the second electric stimulus being different than the first electrical stimulus, and
identify a power demand for the data communications cable and the remote device, the power demand being based on the first and second electrical responses, and being allocated from the power budget when supported by the power budget.

8. An electronic system as in claim 7 wherein the first electrical stimulus is a first voltage, $V_1$, wherein the second electrical stimulus is a second voltage, $V_2$, wherein the first electrical response is a first current, $I_1$; wherein the second electrical response is a second current, $I_2$, and wherein the controller of the apparatus, during identification of the power demand, is configured to:
ascertain a resistance, $R_{CABLE}$, of the data communications cable where $$R_{CABLE} = \frac{V_1 \times I_1 - V_2 \times I_2}{(I_1)^2 - (I_2)^2}, \text{ and}$$

assess power loss through the data communications cable based on the resistance, $R_{CABLE}$.

9. An apparatus to provision power for a remote device which connects to the apparatus through a data communications cable, the apparatus comprising:
a set of ports configured to connect to a set of remote devices through a set of data communications cables, the set of remote devices including the remote device, the set of data communications cables including the data communications cable;
a power supply configured to provide power within a power budget; and
a controller coupled to the set of ports and to the power supply, the controller in combination with the power supply being configured to:
provide a first electrical stimulus to the data communications cable and the remote device, and sense a first electrical response to the first electrical stimulus from the data communications cable and the remote device,
provide a second electrical stimulus to the data communications cable and the remote device, and sense a second electrical response to the second electrical stimulus from the data communications cable and the remote device, the second electric stimulus being different than the first electrical stimulus, and
identify a power demand for the data communications cable and the remote device, the power demand being based on the first and second electrical responses, and being allocated from the power budget when supported by the power budget.

10. An apparatus as in claim 9 wherein the first electrical stimulus is a first voltage, $V_1$, wherein the second electrical stimulus is a second voltage, $V_2$, wherein the first electrical response is a first current, $I_1$; wherein the second electrical response is a second current, $I_2$, and wherein the controller, during identification of the power demand, is configured to:
ascertain a resistance, $R_{CABLE}$, of the data communications cable where $$R_{CABLE} = \frac{V_1 \times I_1 - V_2 \times I_2}{(I_1)^2 - (I_2)^2}, \text{ and}$$

assess power loss through the data communications cable based on the resistance, $R_{CABLE}$.

11. An apparatus as in claim 10 wherein the power supply includes:
a hot swap voltage regulator circuit which is configured to gradually increase output voltage to a nominal operating voltage for the remote device to prevent damaging the remote device when initially powering up the remote device;
wherein the controller, when the first electrical stimulus is provided, is configured to direct the hot swap voltage regulator circuit to provide the first voltage, $V_1$, prior to fully powering up the remote device; and
wherein the controller, when the second electrical stimulus is provided, is configured to direct the hot swap voltage regulator circuit to provide the second voltage, $V_2$, prior to the remote device fully powering up.

12. An apparatus as in claim 11 wherein the controller is configured to sense the first current, Ii, and sense the second current, $I_2$, while the hot swap voltage regulator circuit gradually increases the output voltage to the nominal output voltage for the remote device.

13. An apparatus as in claim 11 wherein the controller is further configured to:
  sense current, $I_n$, after the hot swap voltage regulator circuit has gradually increased the output voltage to the nominal output voltage for the remote device; and
  re-identify the power demand based on the sensed current, $I_n$.

14. An apparatus as in claim 10 wherein the controller includes:
  a voltage sensor configured to sense the first voltage, $V_1$, and the second voltage, $V_2$;
  a current sensor configured to sense the first current, $I_1$, and the second current, $I_1$;
  a multiplexer circuit having a first input coupled to the current sensor, a second input coupled to the voltage sensor, and an output; and
  an analog-to-digital converter circuit having an analog input coupled to the output of the multiplexer circuit and a digital output, the digital output being configured to provide a respective digital value representing each of the first voltage, $V_1$, the second voltage, $V_2$, the first current, $I_1$, and the second current, $I_2$, from the digital output of the analog-to-digital converter circuit to cancel out an error factor, k, inherent in the analog-to-digital converter circuit.

15. An apparatus as in claim 14 wherein the controller further includes:
  an amplifier interconnected between the first input of the multiplexer and the current sensor, the amplifier being configured to enable calibration of a gain to reduce an error factor, z, inherent in the amplifier.

16. An apparatus as in claim 9 wherein the controller is further configured to:
  generate a comparison between (i) the power demand for the data communications cable and the remote device and (ii) the power budget of the apparatus; and
  allocate power from the power budget to the data communications cable and the remote device when the comparison indicates that the power budget supports the power demand for the data communications cable and the remote device, and rejecting allocation of power from the power budget to the data communications cable and the remote device when the comparison indicates that the power budget does not support the power demand for the data communications cable and the remote device.

17. A computer program product that includes a tangible computer readable medium having instructions stored thereon for provisioning power for a remote device connected through a data communications cable, such that the instructions, when carried out by a computerized device, cause the computerized device to:
  provide a first electrical stimulus to the data communications cable and the remote device, and sensing a first electrical response to the first electrical stimulus from the data communications cable and the remote device;
  provide a second electrical stimulus to the data communications cable and the remote device, and sensing a second electrical response to the second electrical stimulus from the data communications cable and the remote device, the second electric stimulus being different than the first electrical stimulus: and
  identify a power demand for the data communications cable and the remote device, the power demand being based on the first and second electrical responses:
  wherein the first electrical stimulus is a first voltage, $V_1$; wherein the second electrical stimulus is a second voltage, $V_2$; wherein the first electrical response is a first current, $I_1$; wherein the second electrical response is a second current, $I_2$, and wherein identifying the power demand includes:
    ascertaining a resistance, $R_{CABLE}$, of the data communications cable where $$R_{CABLE} = \frac{V_1 \times I_1 - V_2 \times I_2}{(I_1)^2 - (I_2)^2}, \text{ and}$$

assessing power loss through the data communications cable based on the resistance, $R_{CABLE}$.

18. In an apparatus connected to a remote device through a data communications cable, a method for provisioning power for the remote device, the method comprising:
  providing a first electrical stimulus to the data communications cable and the remote device, and sensing a first electrical response to the first electrical stimulus from the data communications cable and the remote device;
  providing a second electrical stimulus to the data communications cable and the remote device, and sensing a second electrical response to the second electrical stimulus from the data communications cable and the remote device, the second electric stimulus being different than the first electrical stimulus; and
  identifying a power demand for the data communications cable and the remote device, the power demand being based on the first and second electrical responses;
  wherein the first electrical stimulus is a first voltage;
  wherein the second electrical stimulus is a second voltage;
  wherein the first electrical response is a first current; and
  wherein the second electrical response is a second current.

19. A method as in claim 18, further comprising:
  generating a comparison between (i) the power demand for the data communications cable and the remote device and (ii) the power budget of the apparatus; and
  allocating power from the power budget to the data communications cable and the remote device when the comparison indicates that the power budget supports the power demand for the data communications cable and the remote device, and rejecting allocation of power from the power budget to the data communications cable and the remote device when the comparison indicates that the power budget does not support the power demand for the data communications cable and the remote device.

* * * * *